(12) United States Patent
Getts

(10) Patent No.: US 11,280,432 B1
(45) Date of Patent: Mar. 22, 2022

(54) HOSE AND CABLE SLING SUPPORT DEVICE

(71) Applicant: Thomas James Getts, Cornelius, NC (US)

(72) Inventor: Thomas James Getts, Cornelius, NC (US)

(*) Notice: Subject to any disclaimer, the term of this patent is extended or adjusted under 35 U.S.C. 154(b) by 0 days.

(21) Appl. No.: 17/479,332

(22) Filed: Sep. 20, 2021

Related U.S. Application Data

(60) Provisional application No. 63/081,282, filed on Sep. 21, 2020.

(51) Int. Cl.
*F16L 3/14* (2006.01)

(52) U.S. Cl.
CPC .................... *F16L 3/14* (2013.01)

(58) Field of Classification Search
CPC ... F16L 3/14; F16L 3/233; F16L 3/137; A45F 5/00; A45F 2005/1013; A45F 2005/1006; A45F 5/10; B65D 63/10
USPC ................. 248/60, 74.3; 24/115 H
See application file for complete search history.

(56) References Cited

U.S. PATENT DOCUMENTS

| | | | |
|---|---|---|---|
| 3,420,546 A | 1/1969 | Jasovsky | |
| 3,650,545 A | 3/1972 | Freed | |
| 5,697,128 A * | 12/1997 | Peregrine | F16G 11/14 24/115 G |
| 5,715,578 A * | 2/1998 | Knudson | B65D 63/10 24/115 L |
| 6,651,940 B2 | 11/2003 | Hill, Sr. | |
| 8,408,501 B2 | 4/2013 | Noyes et al. | |
| 8,657,324 B2 | 2/2014 | Waldner et al. | |
| 8,910,347 B1 * | 12/2014 | Wilcox | B65D 63/109 24/16 R |
| 11,085,555 B2 | 5/2021 | Getts | |
| 2003/0041417 A1 * | 3/2003 | Smith | F16L 3/233 24/16 R |
| 2012/0037766 A1 * | 2/2012 | Buras, Jr. | F16L 3/137 248/68.1 |
| 2012/0055738 A1 * | 3/2012 | Larkin | E04G 21/3266 182/138 |
| 2014/0182084 A1 * | 7/2014 | Hill | B60P 7/0823 24/115 H |
| 2014/0217761 A1 * | 8/2014 | Bond, Jr. | F16L 55/005 294/74 |
| 2016/0095420 A1 * | 4/2016 | Moreau | A45F 5/021 248/341 |
| 2016/0095421 A1 * | 4/2016 | Moreau | A45F 5/00 248/341 |

(Continued)

*Primary Examiner* — Christopher Garft
(74) *Attorney, Agent, or Firm* — Memminger E. Wiggins

(57) ABSTRACT

The present invention prevents damage to the hoses and cables extending from a tractor to its trailer by providing a sling-like device being designed and configured to grasp, secure, and support such hoses to prevent their contact with the tractor and its trailer. The present invention comprising a length of polyester webbing having an upper fastener loop and a lower support loop. The lower support loop comprising an upward fold having a 180-degree twist and being designed and adapted to permit the insertion and passage of the upper fastener loop therethrough and thereby defining a pair of conduit support loops. The pair of conduit support loops being designed and configured to receive and graspingly support at least one tractor trailer hose or cable.

12 Claims, 5 Drawing Sheets

(56) References Cited

U.S. PATENT DOCUMENTS

2017/0082232 A1* 3/2017 Bosis .................... F16L 55/005

* cited by examiner

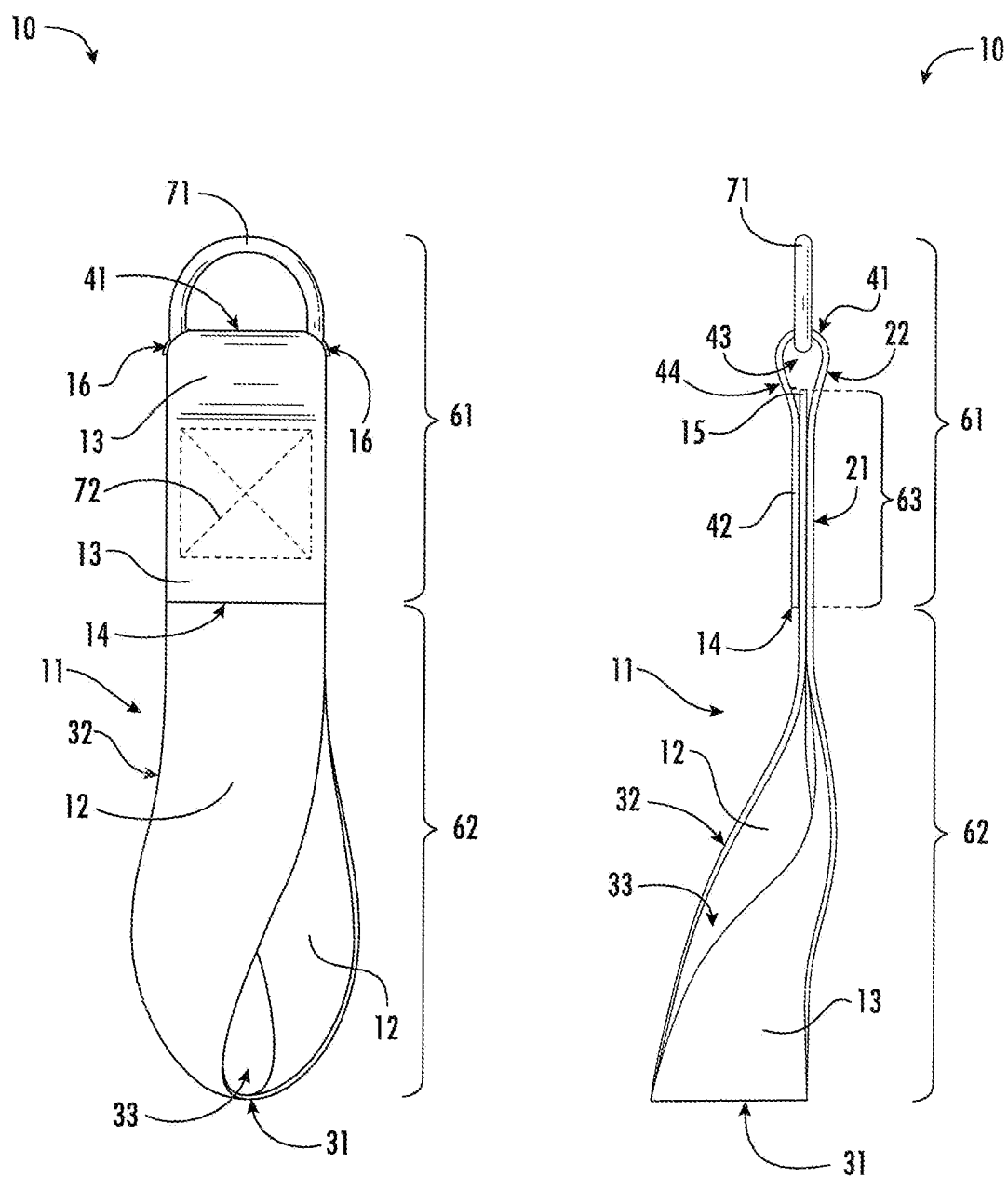

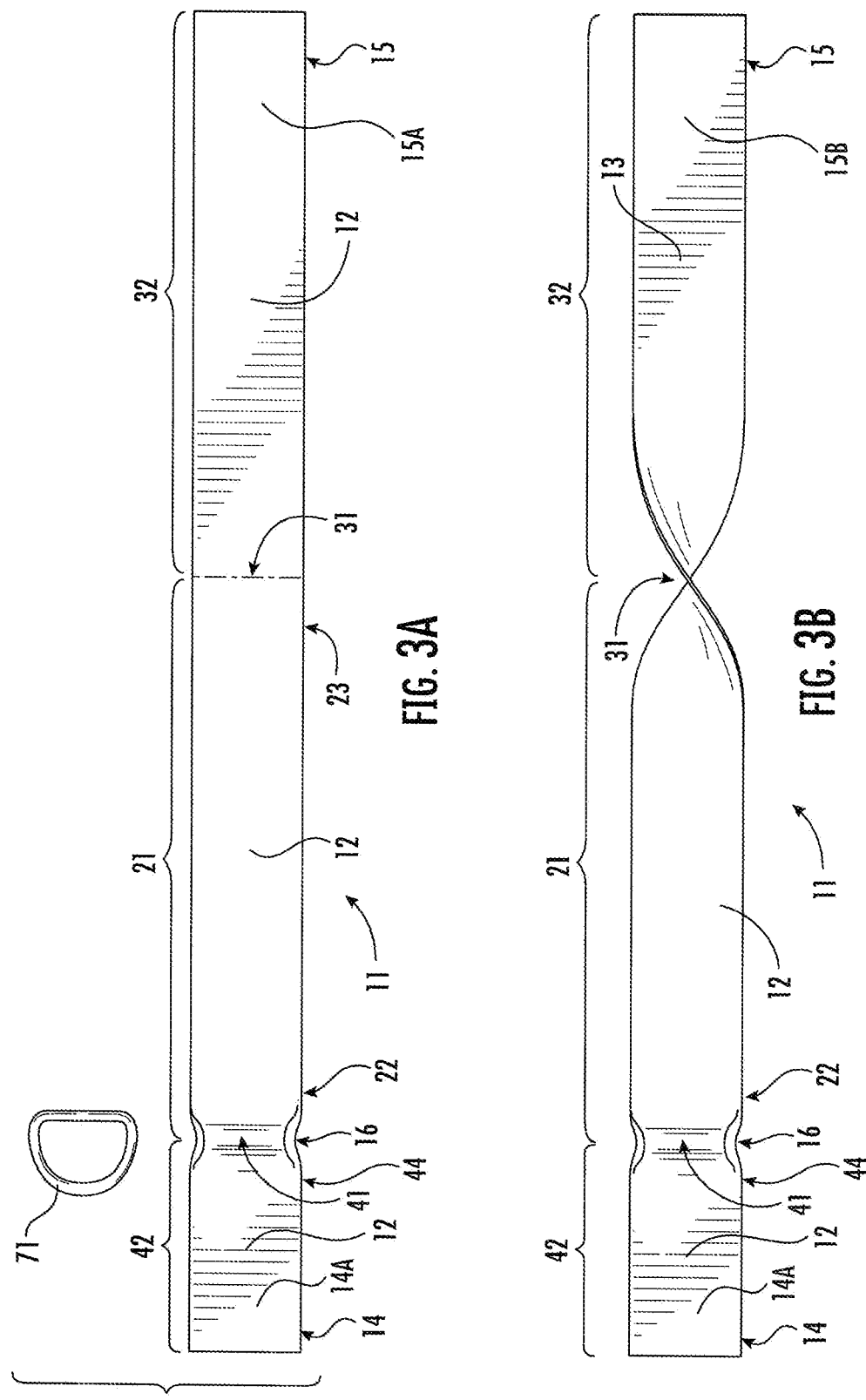

HOSE AND CABLE SLING SUPPORT DEVICE

CROSS-REFERENCE TO RELATED APPLICATIONS

This application claims priority to and incorporates by reference herein U.S. Provisional Application No. 63/081,282 filed on Sep. 21, 2020, and titled "Hose And Cable Sling Support Device".

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING, A TABLE, OR A COMPUTER PROGRAM LISTING SUBMITTED ON A COMPACT DISC WITH APPENDIX

Not Applicable.

FIELD OF THE INVENTION

The present invention is directed towards a device designed to manage prevent damage to the various hoses and cables found on tractor-trailer trucks. More specifically, this invention relates to a device that prevents damage to the hoses and cables extending from the tractor to its trailer by providing a sling-like device which graspingly secures and supports the subject tractor trailer hoses and cables to prevent their contact with the tractor, trailer, or any frame components of the tractor and the trailer.

BACKGROUND OF THE INVENTION

A tractor trailer rig is the combination of a tractor unit and one or more trailers to carry freight. A trailer attaches to the tractor with a fifth wheel apparatus. Pneumatic brake hoses, electrical cables and hydraulic hoses (hereafter collectively or singularly referred to as "tractor trailer conduit line(s)", "conduit line(s)", or "conduit(s)") attach to the rear of the tractor and extend to the front of an attached trailer. These conduits are necessary to transmit pneumatic, electrical and/or hydraulic energy during the operation of the tractor trailer rig. This energy is used for trailer braking, power lighting accessories and hydraulic functions on the trailer. The conduit lines used in this system can be heavy, rigid and vary in length and diameter. These conduit lines must be supported above the catwalk between the tractor and the trailer for safe and proper operation of the tractor trailer. Additionally, the conduit lines must not come into contact with any of the other items that might be located between the tractor and the trailer (i.e., tool-boxes, exhaust stacks, or hydraulic tanks). The movement of the conduit lines are typically managed with a tensioner or springs mounted off the back of the tractor cab or the front of the trailer. Furthermore, the conduit lines must be connected to the tensioner or springs in a static position for proper operation.

The existing method for connection of a tractor trailer conduit lines to the tensioner/spring support mechanism is to secure the conduit lines utilizing a plastic injection molded clip or a bent sheet metal loop having an internal rubber sleeve or grommet. The injection molded clips are line size specific and rigid, and as such tend to limit the functionality of these devices. For example, a clip fora inch pneumatic line cannot support a 1-inch hydraulic line. Additionally, injection molded clips have a smooth internal bore which allows the clip to slide up and/or down the along the conduit lines during typical road or yard operation of the tractor trailer rig. This movement can cause conduits to drag on the catwalk or to catch on objects in between the tractor and trailer. In those situations where the molded clips do grip the conduit lines sufficiently tight to prevent the upward or downward movement of such lines, it can restrict pneumatic and/or hydraulic fluid flow thereby decreasing energy transfer and leading to the possibility of a system failure. The failure of the rubber grommet on the metal clip device has also been observed. Subsequently, the clip's metal becomes exposed and thereby cuts into the conduit lines creating a dangerous situation. Furthermore, existing connection options for conduit lines require regularly scheduled preventative maintenance and constant adjustment. Such a maintenance requirement is the result of conduit lines not being held in a stationary position, rapid wear, and failed lines quickly resulting in tractor trailer break downs or other safety concerns. These situations can be prevented if conduit lines are secured in a stationary location and also are not damaged due to inferior connections.

Accordingly, there remains room for improvement and variation within the art.

SUMMARY OF THE INVENTION

The rear axles of tractor-trailers are provided with pneumatic brakes and electrical traffic indicators. The pneumatic, electric or other forms of energy are necessary to operate the brakes and signals are provided through tractor trailer conduit lines and/or cabling (hereafter collectively or singularly referred to as "tractor trailer conduit line(s)", "tractor trailer conduit(s)", "conduit line(s)", or "conduit(s)") which are connected with the tractor or another trailer in a multiple trailer configuration. The conduit lines are flexible and as such, it is necessary to control the movement of these conduit lines in order to prevent their damage which may be caused by tandem slider operation and/or exposure to the road or road debris. If a pneumatic conduit is damaged, it can cause the trailer brakes to fail and the tractor trailer to become uncontrollable. Damage to electrical cabling can create an explosion if exposed to a combustible environment or the risk of electric short may arise. Even if there is no loss or interruption of electrical or hydraulic power, cabling and hose wear may result in frequent replacement of these items. The present disclosure describes at least one embodiment for a hose and cable sling support device for the guidance, support, and safety of tractor trailer conduit lines while allowing the relay of pneumatic, electrical, hydraulic or other forms of energy from fixed sources to moving mechanisms.

A preferred embodiment of the present invention, a hose and cable sling support device, may be summarily described as comprising an upper portion and a lower portion. The upper portion of the present invention having an upper fastener loop which secures a means for connecting the present invention to a tractor trailer conduit tensioner cable or spring. Additional aspects of the upper portion of the present invention include the upper portion of the base segment, an upper elbow contiguous to the base segment upper end, and a downward fold extending downward from the upper elbow and being parallel to the base segment. The lower portion of the present invention comprises a lower support loop being designed and configured to permit the insertion and passage of the upper portion of the present invention there through and thereby defining a pair of conduit support loops being designed and adapted to grasping encircle and support at least one tractor trailer conduit. Additional aspects of the lower portion of the present invention include the lower portion of the base segment, a lower elbow contiguous to the base segment lower end, and an upward fold comprising a 180-degree twist extending upward from the lower elbow and being substantially parallel to the base segment.

The design and configuration of the present invention provide a pair conduit support loops having flat surfaces of polyester webbing which wrap around and grasp a tractor trailer's conduit lines to allow the conduit lines to be held at an optimal stationary position without upward or downward movement of the lines during the turning, backing, or forward motion of the tractor trailer rig.

One aspect of the present invention is to reduce the likelihood of hose or cable failure due to their excessive un-supported movement.

Another aspect of the present invention provides uniform support and guidance for pneumatic hoses, electrical cables or hydraulic hose without kinking, binding and stretching when applied to all hose and cable management applications.

Yet another aspect of the present invention is to elevate and support all hose and cable components to ensure that they do not come into contact with the tractor floor or "cat-walk" and thereby causing their premature failure.

Another aspect of the present invention is to keep electrical cords, airlines and hydraulic lines away from the cab of a tractor-trailer rig to eliminate chaffing, rubbing, or banging on the body of the tractor.

BRIEF DESCRIPTION OF THE DRAWINGS

FIG. 1A is a front view of the present invention for one preferred embodiment;

FIG. 1B is a side view of the present invention for one preferred embodiment;

FIG. 3A is a top view of a length of polyester webbing from which one preferred embodiment of the present invention is manufactured;

FIG. 3B is a top illustrative view of a length of polyester webbing with a 180-degree twist from which one preferred embodiment of the present invention is manufactured;

DESCRIPTION OF PREFERRED EMBODIMENTS ON THE INVENTION

Figure 2A:
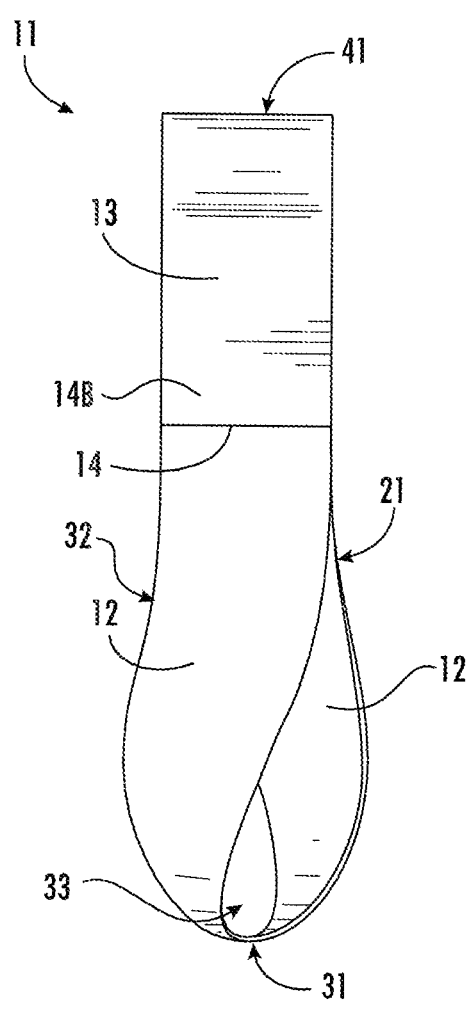
FIG. 2A is a front view of the present invention without stitching for one preferred embodiment.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention. Which broader aspects are embodied in the exemplary constructions.

The present invention, a hose and cable sling support device, is designed and adapted to secure and support tractor-trailer electrical cables, pneumatic brake hoses, hydraulic hoses, and the like, and as may collectively, or singularly, be referred to herein as "tractor trailer conduit line(s)", "tractor trailer conduit(s)", "conduit line(s)", or simply "conduit(s)".

A "3-layer overlap segment" of the present invention being referenced, illustrated, and designated numerically as item "63" on the figures for the subject invention herein comprising adjacent parallel lengths of the downward fold of the length of polyester webbing, the upward fold of the length of polyester webbing, and the base segment of the length of polyester webbing. The overlap length of the 3-layer overlap segment being collectively described as that particular parallel length and portion of the downward fold which overlaps the upward fold, that particular parallel length and portion of the upward fold 32 of the length of polyester webbing 11 that is overlapped by the downward fold 42 of the length of polyester webbing 11, and that particular parallel length and portion of the base segment 21 of the length of polyester webbing 11 being overlapped by the upward fold 32 of the length of polyester webbing 11.

The singular forms "a", "an" and "the" are intended to include the plural forms as well, unless the context clearly indicates otherwise. It will be further understood that the terms "having", "including", "comprises" and/or "comprising" when used in this specification, specify the presence of stated features, aspects, integers, steps, operations, elements, and/or components, but do not preclude the presence or addition of one or more other features, aspects, integers, steps, operations, elements, components, and/or groups thereof.

In the description of exemplary embodiments, relative terms such as "lower", "downward", "upper", "upward", "horizontal", "parallel", "vertical", "lateral", "layered", "mid-section", "adjacent", "above", "below", "up", "down", "top" and "bottom" as well as derivatives thereof (e.g., "horizontally", "downwardly", "upwardly", "inwardly", "perpendicularly", etc.) should be construed to refer to the orientation as then described or as shown in the drawing under the discussion.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As seen in reference to FIGS. 1A, 1B, 2A, 2B, 3A, 3B 4A, 4B, 5A, and 5B, a hose and cable sling support device 10 is provided. A preferred embodiment of the present invention being manufactured from a length of 100% polyester webbing 11 designed and adapted as a hose and cable sling support device for the support of tractor-trailer electrical cables, pneumatic brake hoses, hydraulic hoses, and the like, and as may collectively be referred to herein as tractor trailer conduit lines or simply conduits 81. In a preferred embodiment of the present invention the polyester webbing material having a 6,000-pound breaking strength; a width of about 1.80 inches to about 2.00 inches; a thickness of about 0.043 inches to about 0.050 inches; a weight of about 11.9 pounds per 100 yards; an elongation minimum of about 8% to a maximum of about 14%; a crocking wet value of about 5.0 to a dry value of about 5.0; is not subject to corrosion; and its flammability is self-extinguishing.

Figure 4A:
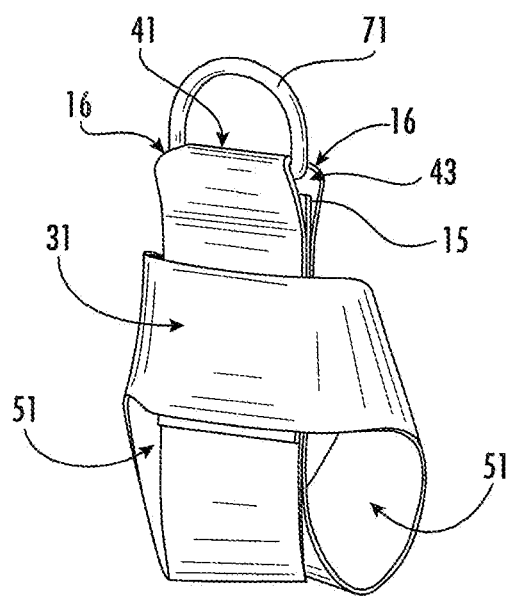
FIG. 4A is a front perspective view of the present invention in its configuration to support conduits for one preferred embodiment.
Figure 4B:
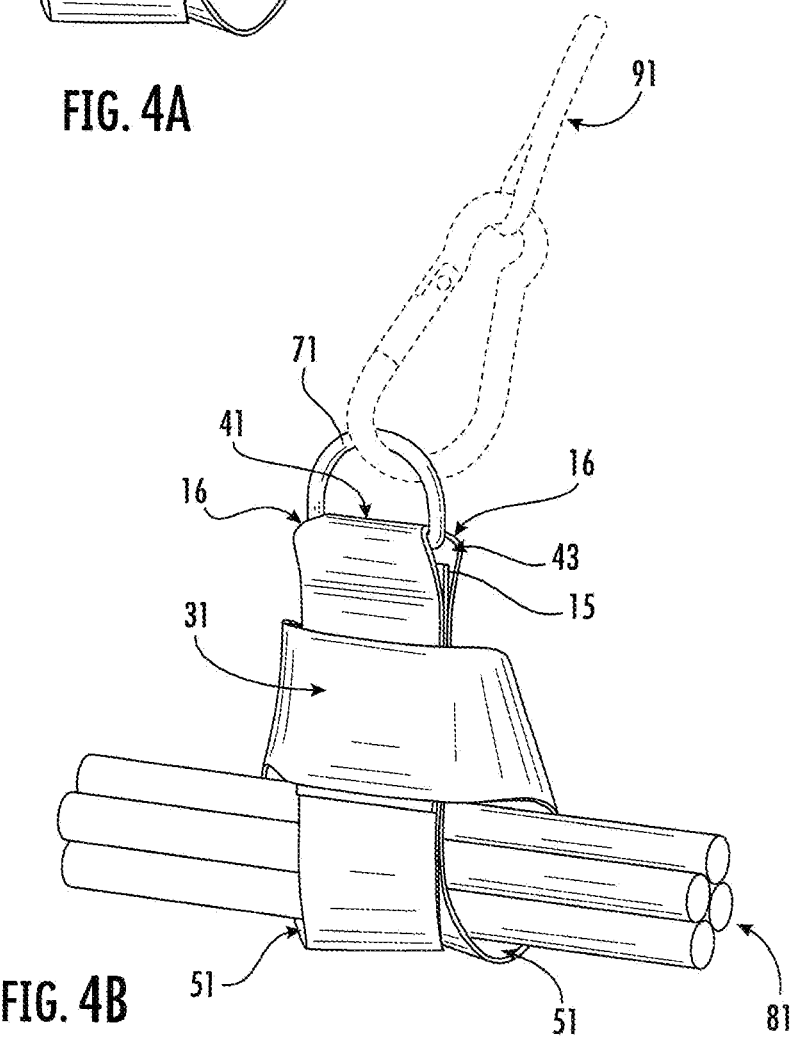
FIG. 4B is an illustrative front perspective view of FIG. 4A of the present invention in its configuration to support conduits for one preferred embodiment.

Referring now specifically to FIGS. 1A and 1B, a preferred embodiment of the present invention may generally be described as comprising an upper portion 61 and a lower portion 62. The upper portion 61 having an upper fastener loop 43 designed and configured to secure a means for connecting the present invention to a tractor trailer conduit tensioner cable or spring. In a preferred embodiment of the present invention the means for connecting the present invention to a tractor trailer conduit tensioner cable or spring includes a metal D-ring 71 secured to the present invention via the upper fastener loop 43. The lower portion 62 of the present invention comprising a lower support loop 33 having an upward fold 32, wherein the upward fold comprising a 180-degree twist. The lower support loop 33 being designed and configured to permit the insertion and passage of the upper portion 61 of the present invention there through and thereby defining a pair of conduit support loops 51 as shown in FIGS. 4A, 4B, SA, and SB, wherein the pair of conduit support loops having flat surfaces of polyester webbing and being designed and adapted to graspingly encircle, secure, and support at least one tractor trailer conduit.

As illustrated in FIGS. 1A, 1B, 2A, 2B, 3A, 3B, 4A, 4B, SA, and SB, a preferred embodiment of present invention 10, a hose and cable sling support device, comprises a metal D-ring 71 secured to a length of polyester webbing 11 via the upper fastener loop 43 of the present invention. As specifically shown in FIGS. 4B and 5B, the metal D-ring 71 being designed and adapted to connect the present invention to a tractor trailer conduit tensioner cable or spring 91. In a preferred embodiment of the present invention the interior diameter/width of the D-ring 71 being about 1.2 inches with a maximum arc radius of about 1.0 inches. The D-ring manufacturing specifications include: material: industrial bright plating quality, 0.187" nominal diameter cold drawn steel wire in accordance with ASTM A-510-07, and the finish being standard commercial grade zinc barrel plating in accordance with ASTM-B633.

Continuing to refer to FIGS. 1A, 1B, 2A, 2B, 3A, 3B 4A, 4B, SA, and SB, a preferred embodiment of the present invention comprises a length of polyester webbing 11 having a width of about 1.8 inches to about 2.0 inches and a length from about 20 inches to about 30 inches. One preferred embodiment of the present invention comprises a length of polyester webbing of about 21⅝ inches. Aspects of the length of polyester webbing for the present invention also include a top side 12, a bottom side 13, an upper end 14 having an upper end top side 14A and an upper end bottom side 14B, a lower end 15 having a lower end top side 15A and a lower end bottom side 15B. Additional features for a preferred embodiment for the present invention 10 include a base segment 21, a lower elbow 31, an upper elbow 41, an upward fold 32, and a downward fold 42.

In a preferred embodiment of the present invention as shown in FIGS. 1A, 1B, 2A, 2B, 3A, and 3B, the base segment 21 includes a base segment upper end 22 and a base segment lower end 23. The lower elbow 31 of the present invention is contiguous to the base segment lower end 23 with the upward fold 32 of the present invention extending upward from the lower elbow 31 to the base segment upper end 22 such that the upward fold 32 is parallel to the base segment 21. For proper orientation and final configuration and positioning of the upward fold 32 the upward fold is rotated to effect a 180-degree twist such that the lower end bottom side 15B of the length of polyester webbing 11-lies adjacent and parallel to the top side 12 of the length polyester webbing 11 at the base segment upper end 22 of the length of polyester webbing 11. In a preferred embodiment of the present invention 10 the length of polyester webbing 11 is designed and configured such that the upward fold length and the base segment length are equal lengths, and wherein the upward fold 32, the lower elbow 31, and the base segment 21 are designed and configured to define a lower support loop 33. Referring to FIGS. 1A, 1B, 4A, 4B, 5A, and 5B, the lower support loop 33 is designed and configured to permit the insertion and passage there through of the upper portion 61 of the present invention comprising the upper fastener loop 43 with its metal D-ring 71, thereby defining a pair of conduit support loops 51 having flat surfaces of polyester webbing to engage at least one tractor trailer conduit 81. The flat surface aspect of the pair of conduit support loops 51 being a unique result of the 180-degree twist of the upward fold 32. The pair of conduit support loops 51 are designed and adapted to graspingly encircle, secure, and support at least one tractor trailer conduit 81. In a preferred embodiment of the present invention the base segment length for the base segment 21 and the upward fold length for the upward fold 32 each being about 9¼ inches. Other preferred embodiments for the present invention include the base segment 21 and the upward fold 32 having equal base segment lengths and upward fold length from about 8⅜ inches to about 13⅝ inches. Increasing or decreasing the respective lengths of the upward fold 32 and the base segment 21 allows the present invention to accommodate a greater or lesser number of tractor trailer conduit lines 81 and/or tractor trailer conduit lines of greater or lesser diameters.

Figure 2B:
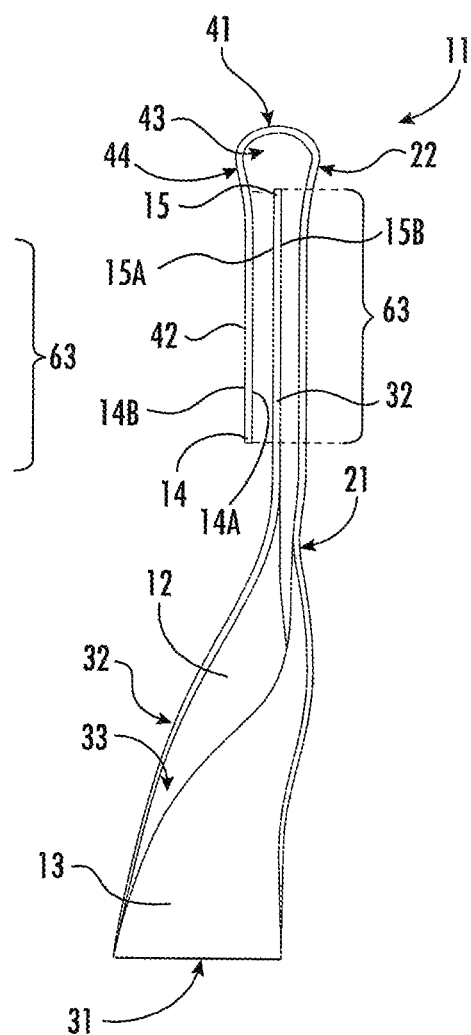
FIG. 2B is a side view of the present invention without stitching for one preferred embodiment.

Now referring again to FIGS. 1A, 1B, 2A, 2B, 3A, and 3B, the downward fold 42 in a preferred embodiment for the present invention has a downward fold length of about 3¼ inches and includes a downward fold lower end 44 that is contiguous to the upper elbow 41. The downward fold 42 extends downward from the upper elbow 41 such that the upper end top side 14A of the length of polyester webbing 11 lies parallel and adjacent to the lower end top side 15A of the length of polyester webbing, wherein the downward fold 42 overlaps the upward fold 32 an overlap length and thereby defining a 3-layer overlap segment 63. Referring now specifically to and as shown in FIGS. 1B and 2B, the 3-layer overlap segment 63 comprising respective parallel overlap lengths of the downward fold 42, the upward fold 32, and the base segment 21. The 3-layer overlap section being more specifically defined and described supra.

Figure 5A:
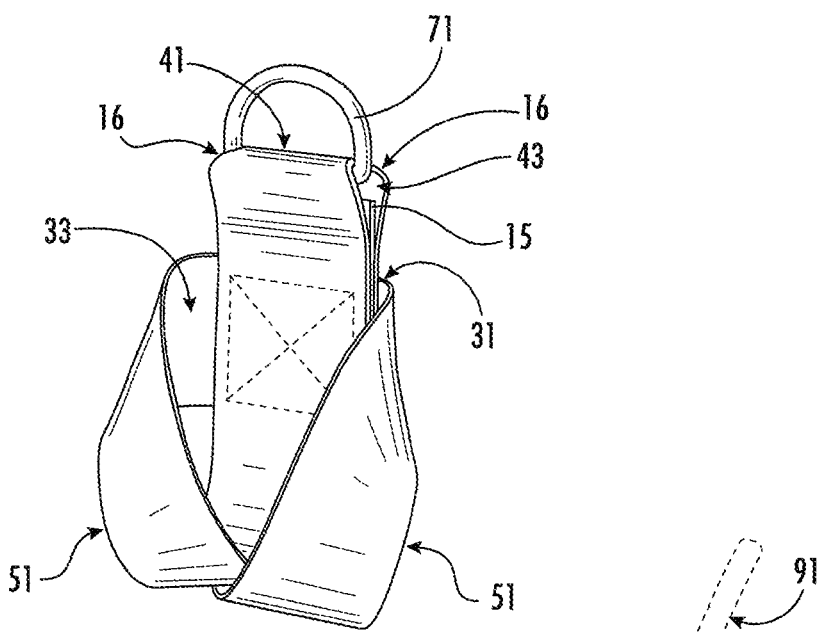
FIG. 5A is the rear perspective view of the present invention in its configuration to support conduits for one preferred embodiment.
Figure 5B:
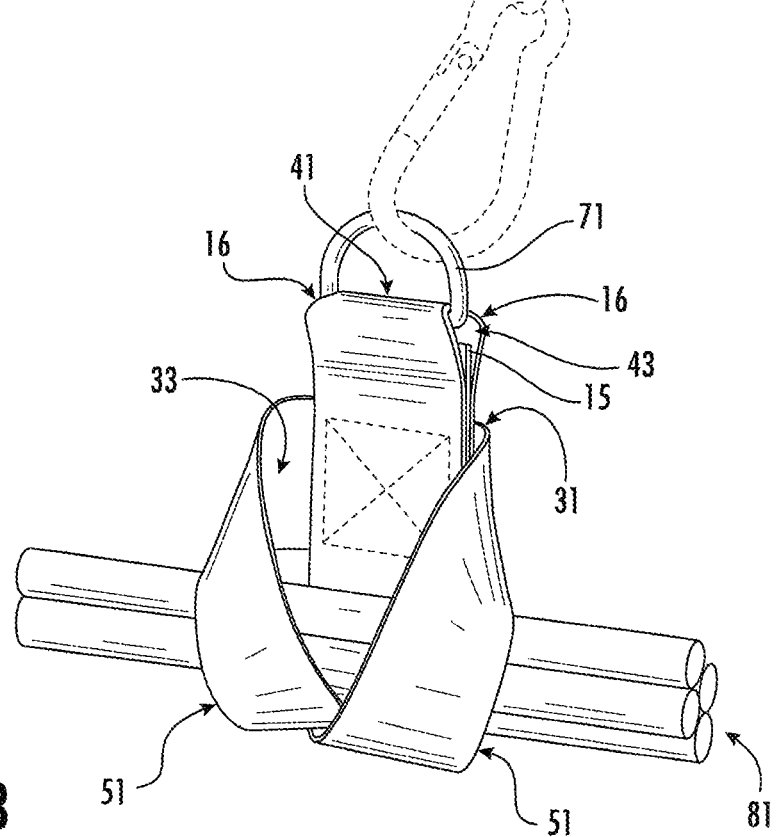
FIG. 5B is an illustrative rear perspective view of FIG. 5A of the present invention in its configuration to support conduits for one preferred embodiment.

Referring again to FIGS. 1A, 1B, 2A, 2B, 3A, and 3B, in a preferred embodiment of the present invention the downward fold lower end 44, the upper elbow 41, and the base segment upper end 22 define an upper fastener loop 43. The upper fastener loop 43 being designed and configured to receive and secure a metal D-ring 71 which provides a means for connecting the present invention 10 to a tractor trailer conduit tensioner cable or spring 91 as shown in FIGS. 4B and 5B. Upon the positioning of the metal D-ring 71 onto the upper fastener loop 43, a "Box X" pattern nylon stitching 72 is applied to and through the 3-layer overlap segment 63 of the present invention to secure the overlapping portions of the base segment 21, the upward fold 32, and the downward fold 42 to one another and to provide a physical closure of the lower support loop 33 and a physical closure of the upper fastener loop 43 to secure the metal D-ring 71 on the upper fastener loop 43. In a preferred embodiment of the present invention the nylon stitching has a thread size of tex-90 and the "box X" stitching pattern being designed and configured to provide a break strength of at least 1,000 pounds. An alternative embodiment of the present invention may use at least one grommet rather than nylon stitching to secure the 3-layer overlap segment 63.

Now referring to FIGS. 1A, 1B, 3A, 3B, 4A, 4B, 5A, and 5B, the metal D-ring 71 for the present invention has an interior diameter/width less than the width of the length of polyester webbing 11 and as such deforms the length of polyester webbing and thereby defining a pair of opposing notch-like indentations 16 within said upper elbow 41. The pair of opposing notch-like indentations 16 serve to maintain the metal D-ring's 71 position within the upper fastener loop 43. The interior diameter/width of the D-ring for one preferred embodiment being about 1.2 inches and the width of the length of polyester webbing 11 being about 1.8 inches to about 2.0 inches.

To use the present invention 10, a hose and cable sling support device, the mid-section of the present invention is placed adjacent and perpendicular to at least one tractor trailer conduit 81. While holding the present invention against the conduit, the upper portion 61 of the present invention is inserted through the lower support loop 33 and thereby forming a pair of conduit support loops 51 with flat surfaces such that the present invention encircles and loosely grasps the tractor trailer conduit(s) 81. The present invention is next slid into position along the tractor trailer conduit(s) 81 as needed for proper support and maintenance of the tractor trailer conduit(s) 81 and for attachment of the D-ring 71 to the tensioner/spring mechanism used by the tractor trailer for support of tractor trailer conduit(s). Once the present invention is properly positioned along the tractor trailer conduit(s) 81, the upper portion 61 of the device is firmly pulled to increase the tension of the pair of conduit support loops 51 on the encircled tractor trailer conduit line(s) 81 and thereby securing the position of the present invention onto the tractor trailer conduit line(s).

The flat surfaces of the pair of conduit support loops 51 enable the present invention to securely grasp the conduit lines and to support the weight load of the conduit lines without restricting the flow of liquid or airflow carried within the conduit lines. Additionally, the present invention is a "one size fits all" solution and will work with a variety of tractor trailer conduit lines including, but not limited to, pneumatic brake, electric, and hydraulic lines. If the support point along the tractor trailer line needs to be adjusted or repositioned, the grasp of the hose and cable support device 10 is loosened by lifting the tractor trailer conduit line(s), thereby taking tension off the device and loosening its grasp around the tractor trailer conduit line(s). The device can then be slid along the tractor trailer conduit line(s) to the desired position and the weight of the tractor trailer conduit line(s) is reapplied to the device such that the present invention may resume its grasp and support of the tractor trailer conduit line(s). A preferred embodiment of the present invention is made of a soft polyester webbing material. Such material will not cut into the tractor trailer conduit lines as is the tendency of some of the current solutions. The present invention can eliminate such annoyance with the use of the present invention and the correct conduit line tensioner. The present invention allows for a more natural movement of conduit lines as it captures such tractor trailer conduit lines utilizing a soft, non-rigid material unlike the rigid plastic or metal options often used. The present invention is designed and configured with a twist much like a slip knot so that it does not bunch the nylon material, but rather it lays flat around the outer diameter of all the conduit lines.

What is claimed is:

1. A hose and cable sling support device comprising:
    a metal D-ring designed and adapted to connect said hose and cable sling device to a tractor trailer conduit tensioner cable or spring; and
    a length of polyester webbing having
        a width,
        a top side,
        a bottom side,
        an upper end comprising an upper end top side and an upper end bottom side,
        a lower end comprising a lower end top side and a lower end bottom side,
        a base segment having a base segment length, a base segment upper end, and a base segment lower end,
        a lower elbow contiguous to said base segment lower end,
        an upper elbow contiguous to said base segment upper end,
        an upward fold comprising a 180-degree twist and an upward fold length, said upward fold extending upward from said lower elbow to said base segment upper end, such that the lower end bottom side of said length of polyester webbing lies adjacent and parallel to the top side of said length polyester of webbing at the base segment upper end of said length of polyester webbing,
        wherein said upward fold length being equal to said base segment length,
        wherein said upward fold, said lower elbow, and said base segment defining a lower support loop,
        a downward fold parallel to said upward fold and having a downward fold length, said downward fold extending downward from said upper elbow and overlapping said upward fold an overlap length and thereby defining a 3-layer overlap segment, said 3-layer overlap segment comprising respective parallel overlap lengths of said downward fold, said upward fold, and said base segment,
        wherein a downward fold lower end, said upper elbow, and said base segment upper end defining an upper fastener loop, said upper fastener loop being designed and configured to receive and secure said metal D-ring,
        wherein said 3-layer overlap segment being fastened together with nylon stitching, and
        wherein said lower support loop being designed and adapted to permit the insertion and passage of the upper fastener loop there through and thereby defining a pair of conduit support loops designed and adapted to graspingly encircle and support at least one tractor trailer conduit.

2. The hose and cable sling support device of claim 1, wherein said width of said polyester webbing being about 1.8 inches to about 2.0 inches.

3. The hose and cable sling support device of claim 1, wherein said length of polyester webbing being from about 20 inches to about 30 inches.

4. The hose and cable sling support device of claim 3, wherein said length of said polyester webbing being about 21¾ inches.

5. The hose and cable sling support device of claim 1, wherein said downward fold having a downward fold length of about 3¼ inches.

6. The hose and cable sling support device of claim 1, wherein said base segment length and said upward fold length each being about 8⅜ inches to about 13⅜ inches, said base segment length and said upward fold length being equal to each other.

7. The hose and cable sling support device of claim 6, wherein each of said base segment length and said upward fold length being about 9¼ inches.

8. The hose and cable sling support device of claim 1, wherein said metal D-ring having an interior diameter less than said width of said length of polyester webbing thereby deforming said length of polyester webbing and defining a pair of opposing notch-like indentations within said upper elbow to maintain said metal D-ring's position within said upper fastener loop.

9. The hose and cable sling support device of claim 8, wherein said interior diameter of said metal D-ring being about 1.2 inches.

10. A hose and cable sling support device comprising:
a metal D-ring designed and adapted to connect said hose and cable sling device to a tractor trailer conduit tensioner cable or spring, said metal D-ring having an interior diameter of about 1.2 inches; and
a length of polyester webbing having a length from about 20 inches to about 30 inches,
a width from about 1.8 inches to about 2.0 inches,
a top side,
a bottom side,
an upper end comprising an upper end top side and an upper end bottom side,
a lower end comprising a lower end top side and a lower end bottom side,
a base segment having a base segment length from about 8⅜ inches to about 13⅜ inches, a base segment upper end, and a base segment lower end,
a lower elbow contiguous to said base segment lower end,
an upper elbow contiguous to said base segment upper end,
an upward fold comprising a 180-degree twist and an upward fold length, said upward fold extending upward from said lower elbow to said base segment upper end, such that the lower end bottom side of said length of polyester webbing lies adjacent and parallel to the top side of said length of polyester webbing at the base segment upper end of said length of polyester webbing,
wherein said upward fold length being equal to said base segment length,
wherein said upward fold, said lower elbow, and said base segment defining a lower support loop,
a downward fold parallel to said upward fold and having a downward fold length of about 3¼ inches, said downward fold extending downward from said upper elbow and overlapping said upward fold an overlap length and thereby defining a 3-layer overlap segment, said 3-layer overlap segment comprising respective parallel overlap lengths of said downward fold, said upward fold, and said base segment,
wherein a downward fold lower end, said upper elbow, and said base segment upper end defining an upper fastener loop, said upper fastener loop being designed and configured to receive and secure said metal D-ring,
wherein said upper fastener loop comprising a pair of opposing notch-like indentations to maintain said metal D-ring's position within said upper fastener loop,
wherein said 3-layer overlap segment being fastened together with nylon stitching, and
wherein said lower support loop being designed and adapted to permit the insertion and passage of the upper fastener loop there through and thereby defining a pair of conduit support loops designed and adapted to graspingly encircle and support at least one tractor trailer conduit.

11. The hose and cable sling support device of claim 10, wherein said length of said polyester webbing being about 21¾ inches.

12. The hose and cable sling support device of claim 10, wherein each of said base segment length and said upward fold length being about 9¼ inches.

\* \* \* \* \*